J. S. WAYNE.
Carriage Top.
No. 94,049.
Patented Aug. 24, 1869.
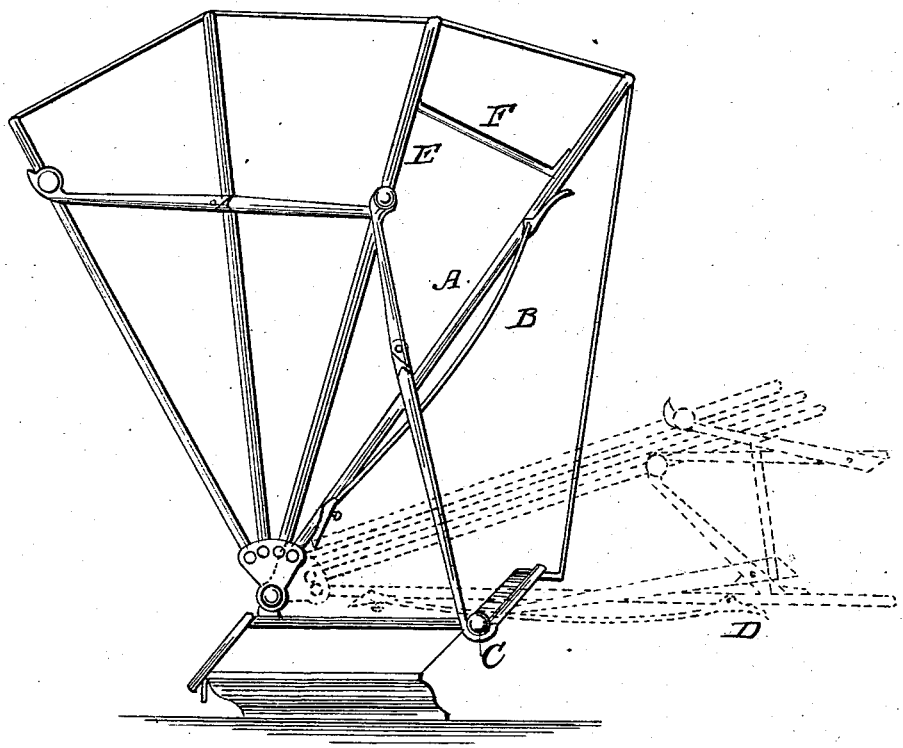

United States Patent Office.

JACOB STILENGER WAYNE, OF QUINCY, ILLINOIS.

Letters Patent No. 94,049, dated August 24, 1869.

IMPROVEMENT IN BUGGY-TOPS.

The Schedule referred to in these Letters Patent and making part of the same.

*To all whom it may concern:*

Be it known that I, JACOB STILENGER WAYNE, of Quincy, in the county of Adams, and State of Illinois, have invented a new and useful Improvement in Buggy-Tops; and I do hereby declare that the following is a full, clear, and exact description thereof, which will enable others skilled in the art to make and use the same, reference being had to the accompanying drawing, forming part of this specification.

The object of this invention is to provide an elastic support for the bows of buggy-tops when turned down, to prevent the wear and danger of breaking to which they are now exposed where they rest on the rear prop, and over which they project about two-thirds of their length. Also to prevent the wrinkling of the leather portion of the top, between the two rear bows.

The drawing represents a side elevation of a buggy-top, constructed according to my improvements when turned up; also, in red outline, when turned down.

I propose to place on the rear side of the rear bows A, springs B, to provide an elastic rest for the same across the rear props C, whereon the said bows rest when turned down, and beyond which they project to such a distance that the weight of the projecting parts causes a severe strain at the points where they rest on the said props, wearing and often breaking them, when moving over rough roads.

These spring consist, preferably, of flat steel, turned up near the ends to form grooves for the bows to fit into, and with ears for connection to the bows at the outer ends, by rivets, as shown at D, but arranged at the inner ends to move back and forth, as required by the lengthening and shortening of the springs under the springing action.

They may, however, be arranged in any other preferred way.

To keep the leather cover always in the stretched condition, between the two rearmost bows A E, I brace them apart by the iron or other rigid braces F.

This keeps the top in this part smooth, and prevents it from wrinkling, as it now does, after using a short time.

Having thus described my invention,

What I claim as new, and desire to secure by Letters Patent, is—

1. The combination of the rear bows A and braces B, with the remaining parts of a buggy-top, as and for the purpose specified.

2. The construction and arrangement together, in the manner specified, of the rear bows A E and braces F, as set forth.

JACOB STILENGER WAYNE.

Witnesses:
J. C. TRIMBLE,
WILLIAM J. WAYNE.